United States Patent
Bak et al.

(10) Patent No.: US 7,975,176 B2
(45) Date of Patent: Jul. 5, 2011

(54) APPLICATION FAILURE RECOVERY

(75) Inventors: Nathan V. Bak, Portland, OR (US);
Gerrit Huizenga, Portland, OR (US);
Ramachandra N. Pai, Beaverton, OR (US); Timothy C. Pepper, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/186,688

(22) Filed: Aug. 6, 2008

(65) Prior Publication Data

US 2010/0037094 A1 Feb. 11, 2010

(51) Int. Cl.
*G06F 11/00* (2006.01)
(52) U.S. Cl. .......................................... 714/21; 714/15
(58) Field of Classification Search .................. None
See application file for complete search history.

(56) References Cited

U.S. PATENT DOCUMENTS

| | | | |
|---|---|---|---|
| 4,665,520 A | 5/1987 | Strom et al. | |
| 5,664,088 A | 9/1997 | Romanovsky et al. | |
| 6,477,663 B1 | 11/2002 | Laranjeira et al. | |
| 6,622,263 B1 | 9/2003 | Stiffler et al. | |
| 6,810,489 B1 | 10/2004 | Zhang et al. | |
| 7,055,063 B2 | 5/2006 | Leymann et al. | |
| 7,296,193 B2 * | 11/2007 | Goode et al. | 714/57 |
| 7,484,220 B2 * | 1/2009 | Kelley et al. | 719/318 |
| 7,716,461 B2 * | 5/2010 | Downer et al. | 713/1 |

OTHER PUBLICATIONS

Melnik et al., "Compiling Mappings to Bridge Applications and Databases," SIGMOD '07, Jun. 2007, pp. 461-472.
Barga et al., "Recovery Guarantees for Internet Applications," ACM Transactions on Internet Technology, vol. 4, No. 3, Aug. 2004, pp. 289-328.
Ta-Shma et al., "Virtual Machine Time Travel Using Continuous Data Protection and Checkpointing," IBM Haifa Research Lab.

* cited by examiner

*Primary Examiner* — Christopher S McCarthy
(74) *Attorney, Agent, or Firm* — Lieberman & Brandsdorfer, LLC

(57) ABSTRACT

A method, apparatus, and article of manufacture to dynamically address and resolve an improper shut-down of an application. Internal state data of the application is stored in persistent memory. New internal state data is dynamically created and authenticated following an improper shut-down of the application. Responsive to the authentication, the application is re-started with the authenticated new internal state data, without being subject to an immediate improper shut-down.

18 Claims, 2 Drawing Sheets

APPLICATION FAILURE RECOVERY

BACKGROUND OF THE INVENTION

1. Technical Field

This invention relates to an automated management system for computer applications. More specifically, the invention relates to modification of one or more critical variables in an application subject to an error, to mitigate repetition of the error during execution of the application.

2. Description of the Prior Art

A crash is a serious computer failure. More specifically, a computer crash means that the computer itself stops working or that an application aborts unexpectedly. The crash may be due to either a hardware malfunction or a software malfunction.

An application or part of the operating system stops performing its expected functions when a computer is subject to a crash. In addition, the application or part of the operating system stops responding to other parts of the system when the computer is subject to a crash. Often the offending application may simply appear to freeze. If this application is a critical part of the operating system kernel the entire computer may crash, i.e. a system crash.

Many crashes are the result of the execution of a single machine instruction. Typical causes are when the application counter is set to an incorrect address or a buffer overflow overwrites a portion of application code due to an earlier bug. Another cause of crashes is a race condition in communication between processes. A first process may send a signal to a second process then stop execution until it receives a response. If the second process is busy, the signal will be forced to wait until the process can get to it. However, if the second process was busy sending a signal to the first process, then both processes would wait forever for the other to respond to signals and never see the other processes' signal.

As shown herein, there are different forms of computer crashes with different causes for the crashes. Not all application executions result in a computer crash. In general, applications store information on their internal state to a file, including the values of all forms of internal application variables. Upon proper shut-down of an application, the application stores its persistent data and finishes with a stored variable indicating the application had a proper completion. Conversely, upon proper start-up of the application, the stored variable is replaced with an indication that the application is running.

In general, an application typically crashes when it performs an operation which is not allowed by the operating system. The operating system then shuts down the application. When the application is restarted following a crash, it is not uncommon for the system to experience a second crash for the same error. The occurrence of the crash is not a cure for the origination of the crash. The element in the application that is the source of the crash is identified as an internal state. Upon restart of an application after experiencing an improper shut-down, the application will return to its previous state based upon a stored internal state. For example, if the application is an electronic mail message application, the previously selected electronic mail message will be selected and previewed. Similarly, if the application is a browser, the previously displayed content will be presented. However, regardless of the form of the application, it is known in the art for data associated with the application to be the reason and source of the crash. In other words, restarting the application is not a cure for the crash as the cause of the crash is generally not removed with the restart. Until the cause of the crash is addressed, the crash will repeat.

It is known in the art that it is impossible to predict an application crash. However, it is possible to observe that a crash has happened. Accordingly, there is a need for a solution that evaluates the cause of a crash and to correct the source of an associated error to mitigate future crashes of the associated application.

SUMMARY OF THE INVENTION

This invention comprises a method, apparatus, and article for recovery of a failed application through modification of an internal state variable.

In one aspect of the invention, a method is provided for recovering a failed application. The application is executed with an internal state of the application stored in persistent memory. Following an improper shut-down of the application; new internal state data is dynamically created. Prior to re-starting the application, the new internal state data is authenticated. In response to a proper authentication of the new internal state data, the application is re-started.

In another aspect of the invention, a computer system is provided with a processor in communication with memory and an internal state of an application stored in persistent memory. A recovery manager is provided in communication with the application to recover the application after an improper shut-down. The recovery manager reads the internal state of the application after an improper shut-down of the program, and dynamically creates new internal state data prior to a re-start of the application. An authentication module is provided in communication with the recovery manager to validate the new internal state data. The recovery manager re-starts the application with the new internal state data in response to validation of the data from the authentication module.

In yet another aspect of the invention, an article is provided with a computer-readable carrier including computer program instructions configured to recover a failed application. Instructions are provided to execute an application and store an internal state of the application in persistent memory. In response to an improper shut-down of the application and prior to a re-start of the application, instructions are provided to dynamically create new internal state data for the failed application. Instructions are provided to authenticate validity of the new internal state data, and to re-start the application in response to a valid authentication, including applying the created new internal state data to the application.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
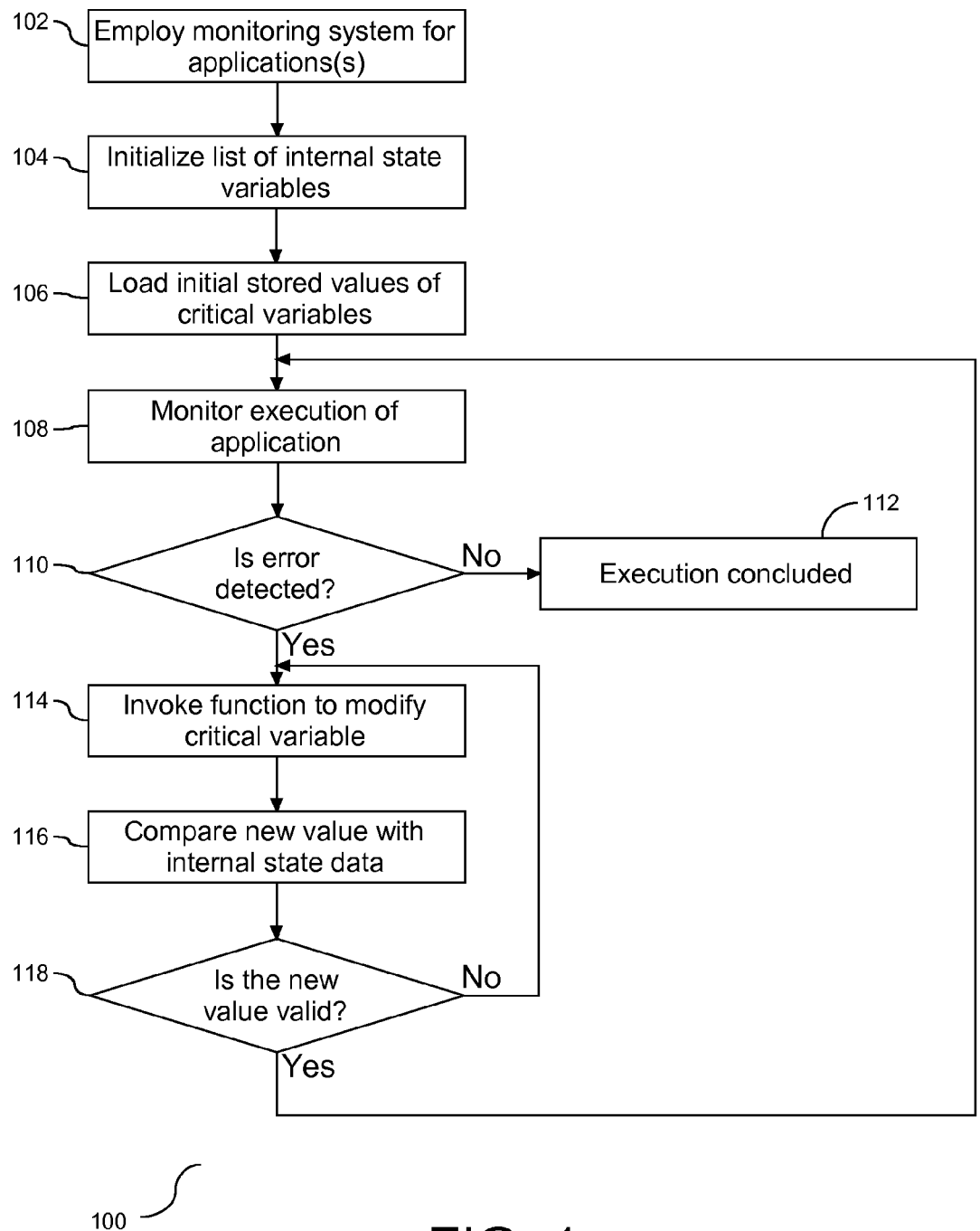
FIG. 1 is a flow chart of the application monitoring and recovery process according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as a manager. A manager may be implemented in programmable hardware devices such as field programmable gate arrays, programmable array logic, programmable logic devices, or the like. The manager may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The method, apparatus, and article of manufacture of the present invention provides valuable advantage over the prior art. According to the present invention, new internal state data is dynamically created and authenticated in response to an improper shut-down of an application. This authentication enables the program to be restarted with valid internal state data without concern for an immediate improper shut-down. The dynamic nature of the response to the improper application shut down is transparent to the underlying application, and removes manual intervention to determine the cause of and solution to the improper shut-down of the application.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

As established in the art, a variable is a container for an attribute of a system which may take on many values during the operation of the system. Such a system may be viewed as a state machine and the system's operation viewed as the path(s) the system takes through different states. The transitions the system makes between states are often controlled by variables, either directly or indirectly, e.g. by making it more likely that a state is reached where another variable directly controls a problematic transition. Variables which directly control or indirectly contribute to transitions to error states in the system operation are referred to as critical variables in the following description.

To further illustrate the invention, FIG. 1 depicts a flow chart (100) demonstrating mitigation of errors in a crash recovery. As shown, a monitoring system (102) is employed to oversee execution of one or more applications. The monitoring system initializes a list of internal state variables (104). In one embodiment, an internal state variable is a variable associated with and critical to the application being executed and is defined by the programmer during the application design process. Each defined internal state variable has an associated categorization of type, which includes but is not limited to an integer, a string, etc. For each defined variable type, the programmer may define a valid range for the variables. The valid range is a defined area within which the application will operate and execute without error. Variables that are external to the range are values within which the application may not properly operate and execute, and is more likely to be exposed to a crash. In one embodiment, the internal state variables together with their types and valid ranges are defined by a programmer and stored in persistent memory, such as in a hierarchical document, or an XML document. Similarly, in one embodiment, the programmer may provide annotations in the code to further define a valid range for the variables. Accordingly, the first part of the application monitoring system is to determine the internal state variables of the application and their associated valid ranges.

Following step (104), the monitoring system loads the initial stored values of the critical variables (106). In one embodiment, the initial stored values may be replaced by default values for the internal state variables. Such default values may be defined by the programmer. The purpose of the default values is to provide a value for the application that will allow the application to start running without exposure to a crash or error from the outset. The monitoring system then monitors execution of the application (108). During execution, it is determined if the application has been exposed to an error that prevents the application exit code from executing (110). A negative response to the determination at step (110) concludes execution of the application (112), and the application is completed without an error.

Alternatively, if it is determined at step (110) that the application has been exposed to an error that does not enable it to conclude without error, this is an indication that internal state data is outside of a defined valid range. A perturbation function is invoked to modify the value of the critical variable(s) associated with the detected error (114). In one embodiment, exposure of an application to an error causes an improper shut-down of the application. There are different classes of perturbation functions, including deterministic and non-deterministic. A deterministic function is a function that follows a specific set of steps, and changes the critical variable based upon the defined set of steps. In contrast, a non-deterministic function is a function that does not follow a specific set of steps, and changes the critical variable with a value selected from a set of multiple values, e.g. randomly or by weighted probabilities. Additionally, the application being monitored may have a failsafe value for the internal state data, which is a neutral value that may be assigned to the critical value(s). The failsafe value is a known data value that will enable the application to function, but perhaps not at an optimal performance level. The monitoring system may be pre-programmed to select a failsafe value, a deterministic function, or a non-deterministic function, based upon the critical variable(s) subjecting the application to failure. Accordingly, following an application error, the value of the critical variable is changed.

Following step (114), the new critical value of the internal state data is compared (116) with the defined valid ranges determined at step (104) to determine if the new critical variable value is valid (118). A positive response to the determination at step (114) is followed by a return to step (108). However, if the response to the determination at step (118) is negative, the process returns to step (114) to change the value of the critical variable(s). Accordingly, by determining the valid range(s) of the critical variable(s), the monitoring system may determine if a changed critical variable value is valid prior to returning to execution of the application.

As shown herein, the monitoring system functions as an automated solution for recovery of an application subject to failure. The monitoring system shown in FIG. 1 is a method for resolving an error in execution of an application. In one embodiment, the monitoring system may be is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

Figure 2:
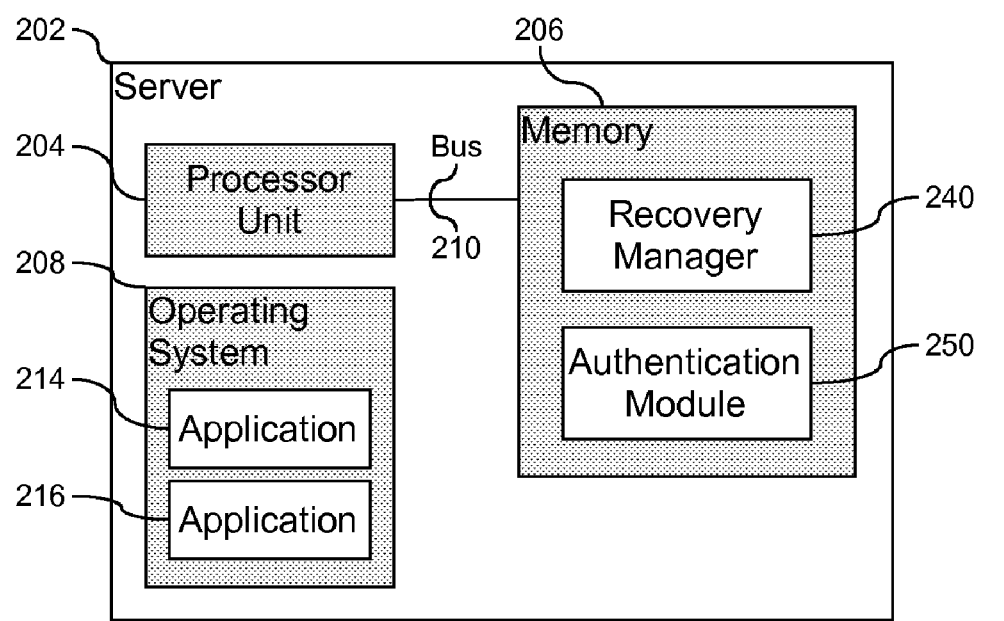
FIG. 2 is a block diagram of a computer system with an embedded manager to monitor and recover an application following failure.

FIG. 2 is a block diagram (200) illustrating placement of an application monitoring device in a computer system. The illustration shows a server (202) with a processor unit (204) coupled to memory (206) by a bus structure (210). Although only one processor unit (204) is shown, in one embodiment, the server (202) may include more processor units in an expanded design. As shown in FIG. 2, the server (202) may execute one or more applications (214) and (216) in an operating system (208) in communication with the processor unit (204). Although only two applications (214) and (216) are shown herein, the invention should not be limited to this quantity of applications. An application management tool in the form of a recovery manager (240) is shown residing in memory (206) of the server (202). The recovery manager (240) mediates and facilitates modification of a critical variable value following an error in the application, as described in detail in FIG. 1 above. The recovery manager (240) may utilize instructions in a computer readable medium to invoke a secondary function to modify the value(s) of the critical variable. In one embodiment, the recovery manager (240) communicates with the operating system (208) for selection of a category of functions to modify the critical value(s) that result in the error. An authentication module (250) is shown residing in memory (206) of the server (202) and in communication with the recovery manager (240). The authentication module (250) validates the new internal state data created in response to an improper shut-down of an application, and communicates the authentication to the recovery manager (240) to re-start the failed application with the new internal state data. Although the recovery manager (240) and authentication module (250) are shown residing in memory, the invention should not be limited to this embodiment. In one embodiment, the recovery manager (240) and/or authentication module (250) may reside as a hardware tool external to memory (206) or implemented as a combination of hardware and software. Accordingly, the manager (240) may be implemented as a software tool or a hardware tool to facilitate mediation and management of the critical value(s) associated with operation of a program or application.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Management of one or more critical variables in application execution enhances operation of a computer system. It is known in the art that all applications are subject to failure at some point in time. A value of a critical variable is inevitably the cause of the error. The solution is to manage the application, and more specifically the value of the critical variable that is the cause of the failure. Accordingly, the management of the application monitors the application for failure, modifies a critical variable value if subject to failure, and tests the modified value to ensure that it falls within a defined range of critical values.

Alternative Embodiments

It will be appreciated that, although specific embodiments of the invention have been described herein for purposes of illustration, various modifications may be made without departing from the spirit and scope of the invention. In particular, the process of creating new internal state data may occur dynamically prior to a re-start of the failed application. This dynamic characteristic enables the manager to be transparent to the underlying application. In addition, the new state data is stored in persistent memory, either prior or subsequent to re-starting the application. Accordingly, the scope of protection of this invention is limited only by the following claims and their equivalents.

We claim:

1. A method for recovering a failed application, comprising:
   executing an application and storing an internal state of the application in persistent memory;
   following an improper shut-down of the application, detecting an error that caused said improper shut-down;
   dynamically creating new internal state data in response to the improper shut-down to replace internal state data associated with said error prior to re-starting the application;
   authenticating the new internal state data; and
   re-starting the application in response to a valid authentication, including applying the created new internal state data to the application.

2. The method of claim 1, further comprising invoking a perturbation function for modifying a state variable associated with the internal state data.

3. The method of claim 2, further comprising comparing the modified state variable to a valid value of the state variable prior to re-starting the application with the new internal state data.

4. The method of claim 2, wherein the perturbation function is a function selected from the group consisting of: deterministic and non-deterministic.

5. The method of claim 2, further comprising storing the modified state variable of the perturbation function in persistent memory prior to re-starting the application.

6. The method of claim 1, wherein new internal state data is a neutral value.

7. A computer system, comprising:
   a processor in communication with memory;
   an internal state of an application stored in persistent memory; and
   a recovery manager in communication with the application to recover the application after an improper shut-down, including:
      a read of the internal state of the application after an improper shut-down of the program;
      dynamic creation of new internal state data in response to the improper shut-down to replace internal state data associated with an error that caused said improper shut-down prior to a re-start of the application;
      an authentication module in communication with the recovery manager to validate the new internal state data; and
      the recovery manager to re-start the application with application of the new internal state data in response to validation of the data from the authentication module.

8. The system of claim 7, further comprising a perturbation function to modify a state variable associated with the internal state data.

9. The system of claim 8, further comprising the authentication module to compare the new internal state data to a valid range of the state variable prior to the re-start of the application.

10. The system of claim 8, wherein the perturbation function is a function selected from the group consisting of: deterministic and non-deterministic.

11. The system of claim 8, further comprising storage of the modified state variable of the perturbation function in persistent memory prior to the re-start of the application.

12. The system of claim 7, wherein new internal state data is a neutral value.

13. An article comprising:
   a computer-readable data storage medium including computer program instructions configured to recover a failed application, the instructions comprising:
      instructions to execute an application and store an internal state of the application in persistent memory;
      instructions to dynamically create new internal state data in response to an improper shut-down to replace internal state data associated with an error for a failed application following an improper shut-down of the application and prior to re-starting the application;
      instructions to authenticate validity of the new internal state data; and instructions to re-start the application, including applying the created new internal state data to the application, in response to a valid authentication.

14. The article of claim 13, further comprising instructions to invoke a perturbation function to modify a state variable associated with the internal state data.

15. The article of claim 14, wherein the instructions to authenticate validity of the new internal state data compares the modified state variable to a valid value of the state variable.

16. The article of claim 14, wherein the perturbation function is a function selected from the group consisting of: deterministic and non-deterministic.

17. The article of claim 14, further comprising instructions to store the modified state variable of the perturbation function in persistent memory prior to re-starting the program.

18. The article of claim 13, wherein new internal state data is a neutral value.

* * * * *